Sept. 30, 1969            E. H. PALMASON            3,469,617

METHOD FOR STRIPPING OF VOLATILE SUBSTANCES FROM FLUIDS

Filed March 20, 1967            6 Sheets-Sheet 1

INVENTOR

EINAR HENRY PALMASON

BY Stevens, Davis, Miller & Mosher

ATTORNEYS

Sept. 30, 1969   E. H. PALMASON   3,469,617
METHOD FOR STRIPPING OF VOLATILE SUBSTANCES FROM FLUIDS
Filed March 20, 1967   6 Sheets-Sheet 3

Fig. 3.

INVENTOR
EINAR HENRY PALMASON

BY
*Stevens, Davis, Miller & Mosher*
ATTORNEYS

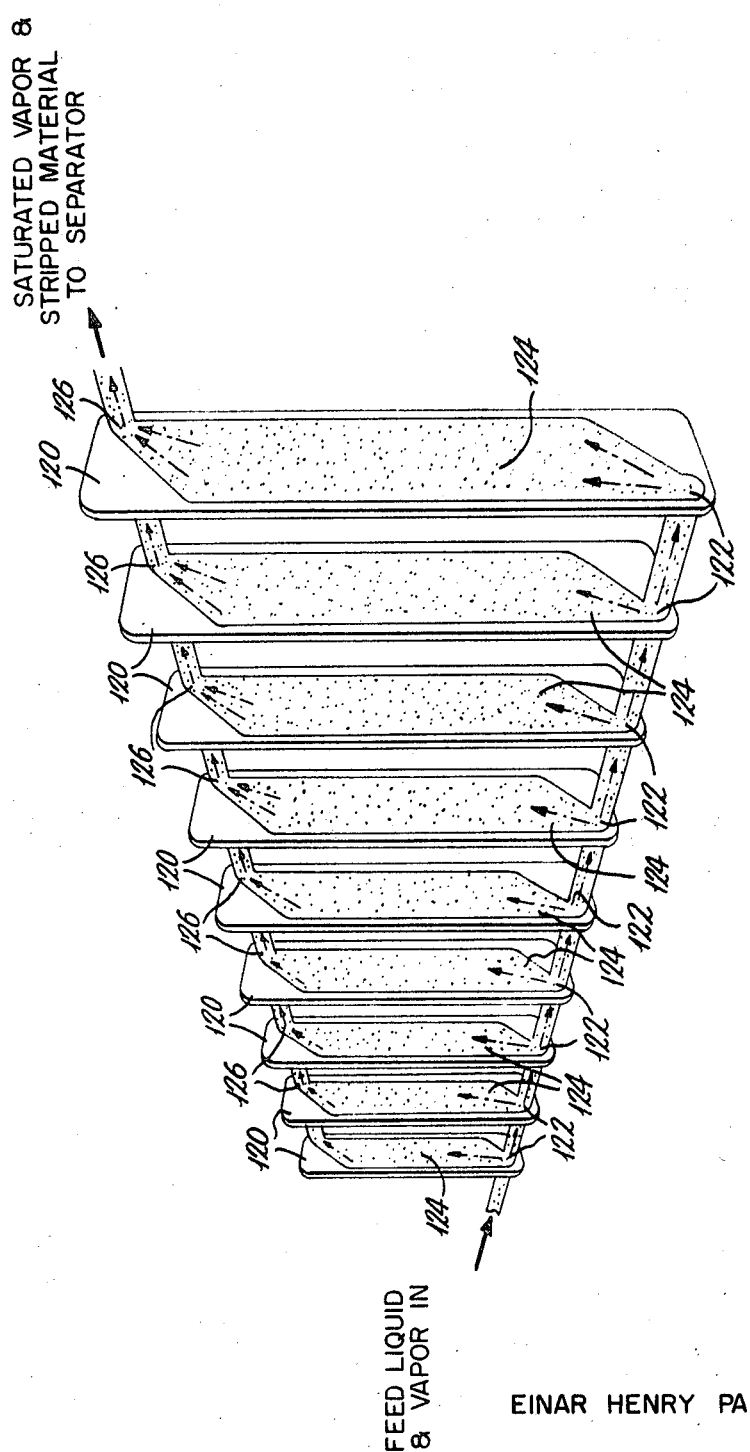

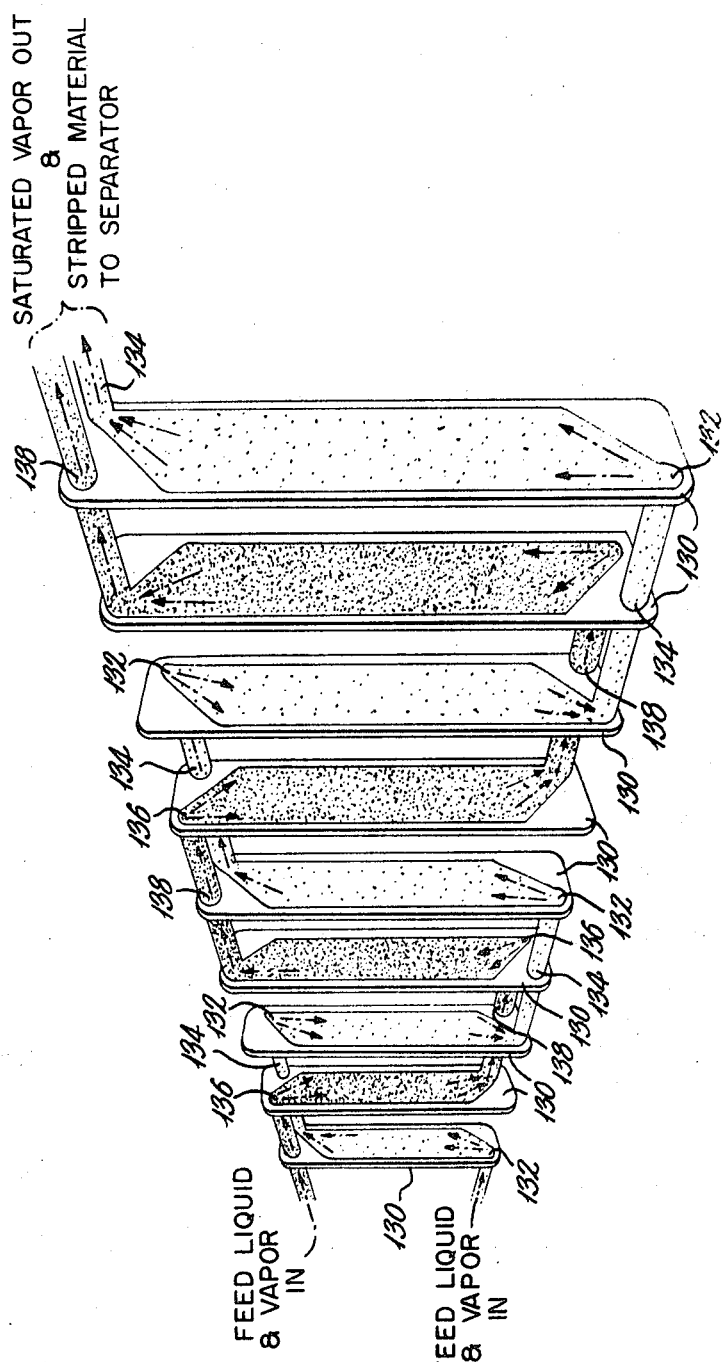

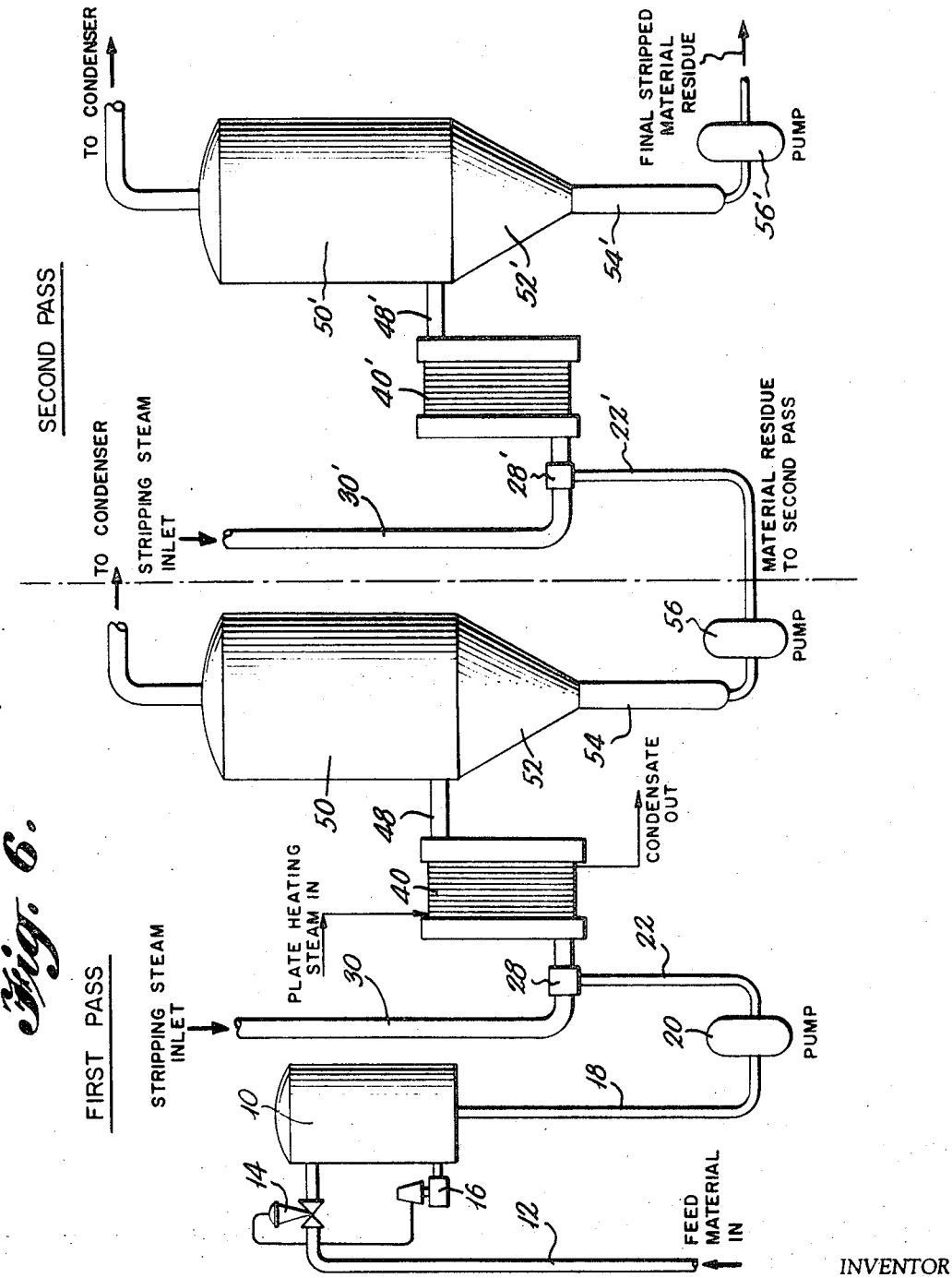

United States Patent Office 3,469,617
Patented Sept. 30, 1969

3,469,617
METHOD FOR STRIPPING OF VOLATILE SUBSTANCES FROM FLUIDS
Einar Henry Palmason, Fort Lauderdale, Fla., assignor to Parkson Industrial Equipment Company, Fort Lauderdale, Fla., a corporation of Delaware
Filed Mar. 20, 1967, Ser. No. 624,583
Int. Cl. B01d 1/14
U.S. Cl. 159—47          15 Claims

ABSTRACT OF THE DISCLOSURE

A method for removing volatiles from feed materials having strippable substances in them by first initiating a continuous vapor phase flow having a temperature below the critical temperature of the feed material within the confines of a tortuous passageway and injecting into this vapor flow at the beginning portion of the passageway the feed material in a manner so as to form a homogenous mixture of small feed material particles dispersed in and surrounded by the vapor phase and flowing the particles and the vapor through the tortuous passageway so as to fragment the particles by impact on the wall of the passageway causing continuous stripping of the volatiles from the particles by the frequent presentation of new surfaces under increasing velocity and reducing pressure as the material and vapor flow through the passageway and exit, the vapor laden with the strippable substances and the feed material being stripped of the volatile substances.

---

This invention relates to the stripping of volatile substances from flowing materials by fragmenting the material and dispersing the minute particles formed into a continuous vapor phase flow at a temperature lower than the temperature at which the feed material being stripped would be damaged and conveying the flow of vapor and particles in homogenous admixture through a tortuous path at a high velocity and at decreasing pressure and further dividing the particles to present new surfaces to enhance the stripping.

An important process in the chemical and food industries is the removal of a volatile substance from a flowing feed material. The quantity of volatile substance may be large, as in the case of solvent removal, or it may be very small, as in the case of the removal of flavor or odor-causing volatiles.

In its broadest sense, stripping is the transfer of volatile substance from the feed material by bringing the material into contact with a gaseous or vapor phase which has a capacity for the substance being transferred.

The vapor or gas used for stripping can be anything with a capacity for the substance being removed, but advantageously, it should be condensable. One of the most common vapors employed in this type of process is steam.

Efficient stripping can best be obtained by bringing the gas and feed into intimate contact at as high a temperature as is safe for the feed material. Usually, when the material being stripped is liquid, massive foaming results from this process as the vapor, due to its low weight and high volume, tends to break through the film, or surface of the material being stripped.

Further, improved stripping results when low pressures are maintained, giving the vapor a greater capacity for the volatile and also increasing the driving force which causes the volatile substance to move into the gas or vapor phase from the feed material. At such low pressures, due to the very large volume of vapor, foam is even more difficult to control.

This foaming requires large and costly equipment and expensive foam-controlling techniques.

Another important feature to insure good stripping is to obtain very good contact between the material being stripped and the stripping gas.

The amount and quality of the vapor used and the intimacy of contact between the material and the vapor are the critical factors used in designing strippers.

Usually, the equipment designed aims at improving one of these factors but tends to sacrifice another.

Typical of equipment designed for this purpose is the batch, or kettle stripper, which consists of a large vacuum vessel containing all the material to be stripped. The material is heated to near the temperature at which the feed material will be damaged and the stripping vapor is sparged into the material through small orifices in a pipe. The gas must be at a pressure sufficient to overcome the static head of material above it. The gas or vapor thus introduced into the hot material expands as it rises through the material and it picks up volatile substances from the material which it contacts. The gas, containing the stripped substance, finally breaks the surface of the material and is exhausted through a condenser and the vacuum system. This system is effective but slow, for example, when one pound of stripping steam is required for one pound of material, which is a fairly general proportion, and the vessel is held under a vacuum of 28" Hg, nearly 20,000 cubic feet of vapor must be contacted with 1 cubic foot of the liquid. As this volume must break the material surface, it is apparent that a long period of time is required to reach this proportion without causing undue foaming.

Another well known method of steam stripping is a technique which materially decreases the stripping time by spraying or flowing the material into the gas or vapor. Representative of this method is the bubble cap, or tray tower, where gravity flow of material brings thin films into contact with the gas. The number and dimensions of the trays control its efficiency by offering new surfaces to the stripping vapor.

Here the proportion of stripping vapor to material to be stripped can be greatly improved over the batch or kettle stripper. But the equipment needed to carry out this process is large and the flow is countercurrent with the stripping vapor at approximately the same quality from bottom to top of the tower. Massive foaming also results from this process when the material being stripped has foam-forming characteristics. This foam can be controlled by reducing the proportion of vapor to material being stripped, and thus lengthening the time for the process, or by using defoamers which are costly and frequently damage the material which retains the defoamer.

A variation of this method sprays the material into a vapor atmosphere as it moves through a large vessel and allows the sprayed particle to fall through the vapor by gravity. This last method has the advantage of preventing foam, but the equipment needed is large, expensive and the operation is slow.

This invention contemplates an improved technique of U.S. Patent 3,073,380 and other known stripping methods to accomplish the continuous stripping of volatile substances from all flowing materials containing a strippable substance with improved efficiency and at a high rate but particularly where materials being stripped are foam-forming or heat-sensitive, by first initiating a high velocity continuous phase of vapor flowing through a tortuous path and into it adding the material to be stripped in its required weight proportion to the vapor, fragmenting the added feed material and dispersing it in the gas flow and allowing it to impinge on the surfaces comprising the walls of the tortuous paths, which paths may be externally heated, causing new surfaces of material to be exposed to contact with the gas, continuously stripping volatile substance as the homogenous admixture passes at high velocity through the tortuous path, exiting into a separator vessel where separation of the volatile laden vapor and stripped material is effected by gravity.

While this invention contemplates the stripping of all flowable materials, the special case of foam-forming fluids represents the most difficult problem in combining a high proportional volume of vapor with the material to be stripped. It is shown in my U.S. Patent 3,073,380 that foam can be controlled or prevented, or reduced to a practical level by insuring that in a mixture of vapor and fluid, the vapor represents the continuum and the liquid portion is discontinuous and moving at the same velocity as the vapor. My U.S. Patent 3,073,380 accomplishes this by generating vapor from the feed material by the application of heat during the fluids movement through a tortuous passageway described in that patent. A degree of stripping could be attained in that manner; however, when the amount of volatile material, i.e. the vapor-forming substance was small, sufficient volume could not be generated by vaporizing it to give the needed continuum, and foaming resulted. Further, it was found in certain cases that, where the volatile substance in the material had a higher boiling point than the temperature at which the product is damaged or the boiling temperature of the other substance or substances not to be stripped, it could not be vaporized without causing damage to the product, or without volatilizing some other substance of a lower boiling temperature which was not to be removed.

The invention herewith described represents an important improvement over my U.S. Patent 3,073,380 and other conventional methods described above in finding that by supplying the heat by initiating the vapor continuum from an outside source as the continuum and source of heat rather than to generate from the material by the application of heat or as a complement to vapor generated from the feed material by application of heat from another source, the problems described above could be overcome and also give a marked improvement in the efficiency of the stripping operation.

The tortuous path means of this invention must be capable of allowing the vapor to continue to expand to impart high velocity flow and have there sufficient tortuousness to cause the particles of material to be further subdivided or fractionalized or otherwise to provide new exposed surfaces of the feed material as they travel through the path. An example of a suitable tortuous path is the plate construction in the plate type evaporator system disclosed in my Patent No. 3,073,380 discussed above which provides a continuous tortuous path arrangement to permit the vapor to expand as it travels through the path.

It will be further appreciated that the use of a venturi-type distributing device to provide a jet-like injection of the feed material into the continuous vapor flow produces immediate entrainment of the particles while dispersing them so that they are continuously surrounded by vapor and by further fractionalizing the particles there is produced new particles having different surfaces or new surfaces on the initial particles so that the total effect of the entrainment material passing through the tortuous passageway provides an extremely large and always changing specific surface of material to the vapor so as to promote a higher degree of volatilization of the strippable substances than has heretofore been possible by the use of prior art systems.

To initiate the two-phase flow of a type needed for the purpose of stripping or volatizing substances from the feed material introduced in it in fragmented form, it is necessary to get the material to be stripped into a vapor path with the most effective "active surface factor," and at the highest temperature commensurate with the sensitivity of the material being stripped. Also, a proper ratio of feed material to the vapor must be maintained continuously under controlled, metered conditions at the point of entry.

The conditions at the point of entry of the material to be stripped into the vapor path frequently change due to temperature degradation and the resulting scaling or coagulum which will often occur at this critical point—where temperature is highest or where flow patterns are erratic. A build-up of such degraded material causes a change in dimension, in temperature, and in the ratio of vapor to material being stripped. For commercial purposes, it is important to have this particular point unchanging, or if the material is extremely unstable, to slow down the rate of change as much as possible, to make for steady, practical stripping conditions. It has been found that the use of a smooth non-sticking surface such as "Teflon" to form the wall of the venturi-type feed device and the orifice through which the material is injected into the vapor provides excellent results in both maintaining the temperature conditions at their desired point and in insulating the wall of the feed chamber just before the material is injected into the vapor.

It has been found that by putting a constriction in the vapor flow path such as a venturi, thereby causing extremely high velocities to occur at the actual point of injection, any fouling at the mixing point of the feed material with the stripping vapor is substantially overcome.

In one embodiment the point of injection of the material is made by joining an annular chamber around the vapor line adjacent to the venturi-type constriction in it and having an annular orifice connecting the chamber with the interior of the venturi so that a metered amount of feed material can be discharged into the interior of the venturi-type constriction. Another type of embodiment is the insertion into the vapor line of a smooth fid-type constriction, which increases vapor velocity at a point where the strippable material is injected from an annular slot in the fid. The term "fid" defines a pin-like structure that tapers at one end to a point and forms a constriction when positioned in a gas conducting conduit so that the tapered end points downstream of gas flowing through the conduit and thereby provides a high degree of turbulence of the gas as it passes the fid constriction.

In other embodiments the insertion into the vapor line may contain a screw feeding device and small holes through which the material to be stripped can be extruded or metered. This is useful in the case of powders, slurries, or pastes of high viscosity. The fid-type device is smaller in diameter by a predetermined dimension over the internal diameter of the vapor line so as to give a chosen pressure drop across the device and to cause a high vapor velocity in the annular space between the device and the line wall. The material to be stripped is fed into the fid device and emerges from the device at the point of highest vapor velocity.

This type of design gives smooth annular flow at this injection point so that no eddy currents or back flow occurs which would allow product to remain at high temperatures for any period of time to cause quality change.

The velocity at the point of injection is high and stream-lined so that it positively carries all product with it downstream. Shortly after the injection point is passed, the fid and the venturi-type injector are varied in diameter causing a pressure drop and high turbulence which is the cause of the intimate contact between material to be stripped and the stripping vapor or medium.

Exemplary of the feed materials is any type of flowable material which contains a volatile substance which can be removed by vapor contact. This feed material may be in the form of liquid mixtures or solutions, emulsions, slurries, suspensions, powders, or the like.

Because of the exact control possible with this system, these materials may be heat-sensitive or robust. The system can be particularly advantageous where these feed materials are high foamers, or where the volatiles are particularly difficult to strip or where breakdown or damage can be caused by prolonged contact to heat.

Specific examples are synthetic polymer or copolymer latices or solutions, containing residual monomer or solvent, oils containing odorous volatile substances, food juices or slurries from which flavors or aromas are to be removed, chemical fluids from which a volatile fraction is to be removed, slurries such as detergent-type materials from which residuals are to be removed, resin-type slurries from which residual monomer or solvents are to be removed.

Exemplary of the gases used in this system are gases and/or vapors which can be made to carry the feed material and which can supply the heat necessary to volatilize the substance or provide the necessary low pressure to allow transfer of the volatile substance from the feed material to the vapor continuous phase.

Advantageously, the gas should be condensible below the critical temperature to improve the economics of the system although non-condensible gases can be used with extraction equipment supplying the low pressure to cause flow conditions.

Water vapor or steam is extremely effective as both a source of heat for the volatilization of low boilers such as methyl alcohol, hexane, pentane, etc. and to supply the continuous vapor phase necessary for the operation of this system. However, sufficient excess of steam must be used to maintain the continuous vapor phase when the volatile material is not present in sufficient quantity to provide it.

When water vapor may not be used due to product reaction or contamination, other vapors such as toluene, ethylene chloride, alcohols, etc., can be used, again in sufficient quantity to insure continuity of the vapor phase.

Frequently, it has been found that some of these vapors made from low latent heat liquids are not capable of carrying sufficient heat to the material in which case heat may be applied through the walls of the tortuous passageway as well as supplied via the vapor phase. This is the case where toluene vapor is used as the continuous vapor phase while volatilizing toluene or other solvents from an oil.

These and other objects of the invention will become apparent from the following drawing and description which are exemplary of the invention but not limiting thereof, in which:

FIGURE 1 is a typical arrangement of the stripping system of this invention showing a material feed tank, a unit for providing a tortuous path, a venturi-type obstruction having a feed material distributor therein near the entrance of the tortuous path for dividing the material into minute particles and dispersing it in the continuous vapor phase flow entering the distributor, and a separator for separating the material from the vapor containing the stripped substance;

FIGURE 3 is a view in cross-section showing a vapor flow inlet pipe having a fid positioned in it to produce a venturi-type effect of the vapor passing around it and an annular ring-like groove in the fid for metering feed material to be stripped into the vapor;

FIGURE 4 is a diagrammatic view showing a plurality of stripping plates arranged to provide a tortuous path for passages of the continuous vapor phase with the particles of feed material therein to effect continuous stripping of volatile substance from the material;

Figure 1:
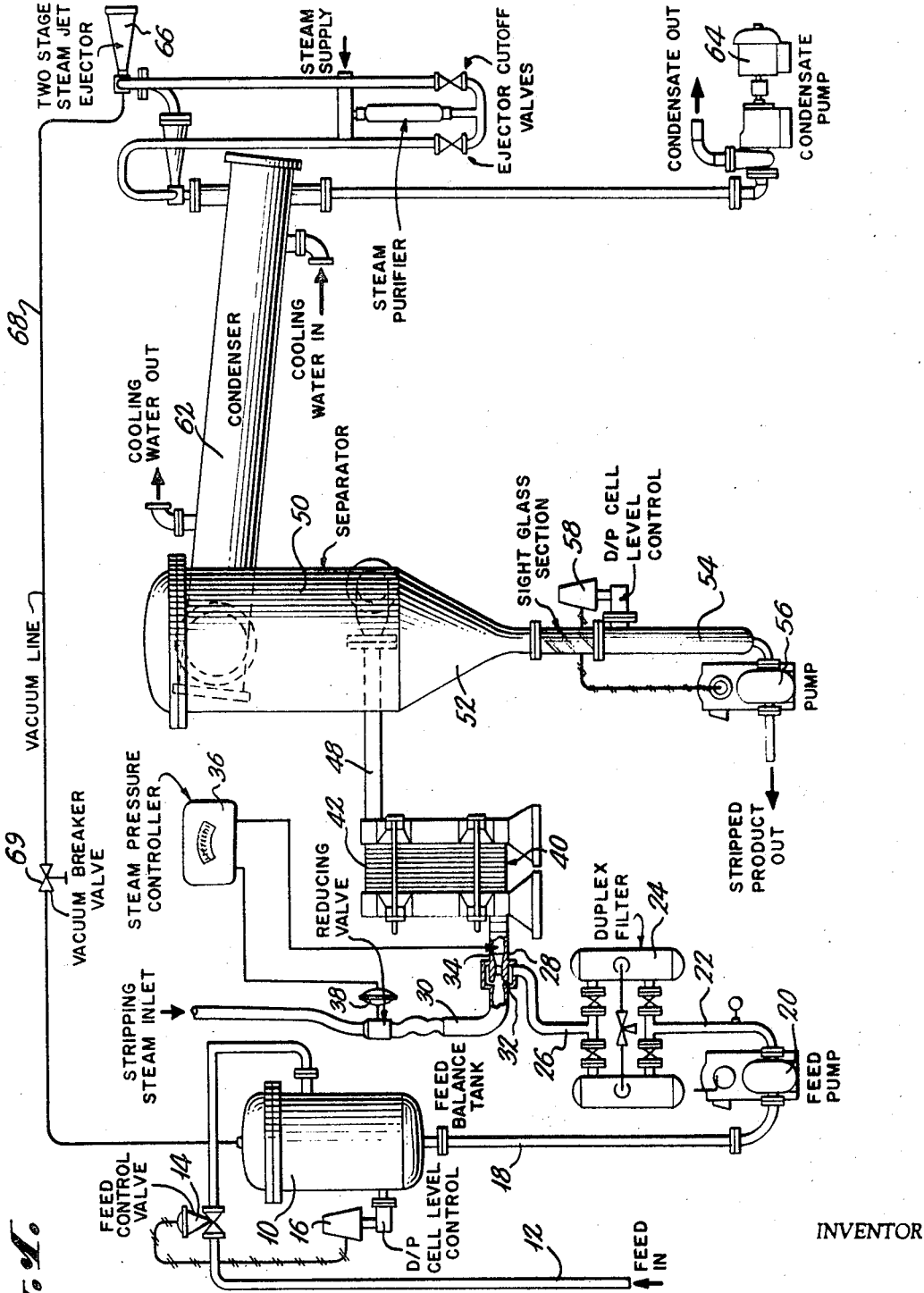

FIGURE 5 is a diagrammatic view showing an alternate arrangement of a plurality of stripping plates in which the vapor flow with particles of feed material therein are split into two flows, each flow passing through alternate spaces between plates; and FIGURE 6 is an alternate arrangement of the stripping system shown in FIGURE 1 in which two tortuous paths are arranged in series, the stripped product of the first tortuous path becoming the feed material for the second tortuous path.

In the drawings, FIGURE 1 illustrates a typical stripping system of this invention. The system has a material feed tank 10 supplied with feed material through incoming feed line 12. Positioned in the feed line 12 is feed control valve 14 operatively connected to a level control unit 16 which controls valve 14 and maintains the level of the feed tank at its desired level. The material exits from feed tank 10 through line 18 into feed pump 20 where the feed is pumped through line 22 into and through a duplex filter 24 which removes from the feed or feed material any undesirable or foreign matter such as dirt, lumpy particles, and the like. A line 26 for conveying material from the duplex filter is connected to an obstruction 28 which is positioned in an inlet steam or vapor line 30 through which is passed the steam under the temperature and pressure needed to strip the volatiles from the material.

A constriction 28 is capable of increasing the rate of flow of the steam through it, in a venturi-like manner, with turbulence after the steam has passed the constriction. The constriction 28 has a distributor type orifice 32 in it which is connected to line 26 through which feed material from the duplex filter is fed through the orifice and injected into the steam passing through the constriction. As the steam passes through constriction 28, it has dispersed in it particles of feed material and due to the high velocity of the steam at this point and the turbulence of it, there is produced a homogeneous mixture of a continuous steam phase with a discontinuous particle phase in it.

The incoming steam is controlled by a temperature probe 34 which is positioned in the steam line 30 immediately downstream of the constriction 28 and is connected to a steam pressure controller 36 which translates and controls the steam pressure reducing valve 38. The temperature probe 34 assures that the temperature of the steam exiting through constriction 28 is maintained below the critical temperature of the feed material being fed into the steam through orifice 32 (see FIGURE 1).

The steam inlet line 30 is connected to a plate pack stripping unit 40 of the construction shown in expanded arrangement without gaskets in FIGURES 4 and 5 of the drawings of the present invention. The plate stripping unit 40, which presents a tortuous confined path or passageway 42, directs the steam flow with the particles admixed therein and allows for the continuous expansion of the steam as it flows through. The continuous flow of the steam and particles through the tortuous path causes impact of the particles on the wall of the path, thereby fracturing or fragmenting the particles to continuously present large numbers of new and different surfaces to the turbulent steam, which allows for the most efficient stripping of the volatiles from the material.

The steam laden with the volatiles and the stripped material exit through line 48 into a separator 50 in which the steam is separated from the material and removed, and the stripped material residue falls by gravity to the bottom of the separator. The separator has a conical bottom 52 and a draw-off pipe section 54 connecting it to a pump 56 which removes the stripped material residue from the separator as it accumulates. The removal of the residue is controlled by a level control 58 which is operatively connected to pump 56 and controls the speed of the pump to prevent accumulation of residue in the conical bottom 52. Also, a sight glass section 60 is positioned in the exit pipe section 54 so as to observe the movement of the residue during the operation of the stripping system (see FIGURE 1).

The steam in the separator is removed from the top of it and passed into a condenser 62 in which the vapor and the stripped volatiles there are condensed and removed by condensate pump 64. The feed tank 10 and a two-stage steam ejector 66 in the condensing system as well as the stripping system as a whole are operated under vacuum through vacuum line 68 with vacuum breaker valve 69 in it (see FIGURE 1).

Figure 2:
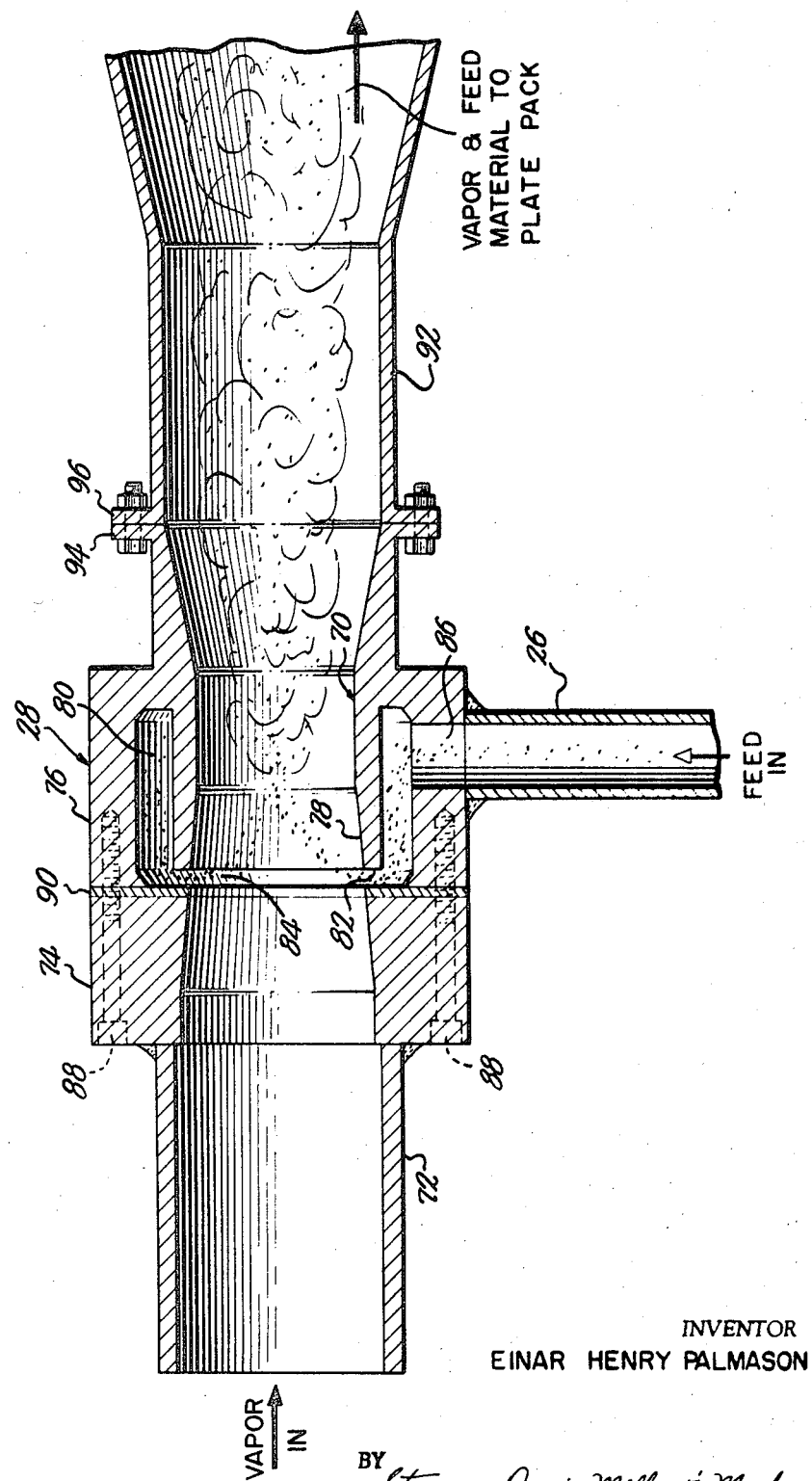
FIGURE 2 is a view in cross-section showing a vapor inlet pipe having an annular feed chamber around its periphery with a ring-like orifice in the wall of the pipe and in a venturi-type obstruction in the pipe for producing turbulence to effect injection and distribution of the material when vapor is flowing through the pipe.

The obstruction in the incoming vapor or steam line for forming the vapor admixed with particles of material of this invention may be a venturi-type construction. FIGURE 2 represents a venturi 70 having an inlet vapor line 72 connected to it. The venturi 70 is formed from two sections 74 and 76 having a restriction or throat 78. Section 76 defines an annular chamber 80 which surrounds the throat of the venturi and provides a reservoir for holding feed material until it is fed into the vapor flow. An annular internal groove 82 connects chamber 80 with throat 78 to form a channel or orifice 84. When section 74 is connected to section 76, annular groove 82 provides for communication of chamber 80 with the interior of throat 78 of the venturi 70. Connected to section 76 is feed inlet line 26 which permits the passage of feed material through a hole 86 to chamber 80. Section 74 is held in position with section 76 by bolts 88. A spacer 90 having an internal diameter equal to the throat 78 of the venturi 70 may be used to widen orifice 84 and thereby meter the flow of material into the vapor as desired, depending on the nature of the material being fed and its physical conditions. Attached to the downstream end of section 76 is a pipe 92 held in position by lugs 94 and bolts 96 which provide the conduit for conveying the vapor and material admixture into the tortuous path 42 of the plate pack stripping unit 40 (see FIGURE 2).

Thus, it can be seen, when the vapor enters the inlet end of vapor line 72, it is throttled as it passes through the venturi 70 and its velocity is greatly increased. Feed being radially injected through the annular orifice 80 towards the center of the throat of the venturi enters the vapor and is dispersed in it as the vapor exits from the throat of the venturi. Upon exiting from the throat of the venturi, the vapor-material admixture is subjected to a high degree of turbulence which further distributes the particles in the vapor so that there is formed a continuous vapor phase admixture with the particles of material finely dispersed and distributed therethrough.

In FIGURE 3 is shown an alternate type of obstruction device 28 in which a venturi-like action is effected in the distribution of material into the vapor flow by injecting the material radially outward towards the inside wall of the inlet vapor line 118. In this arrangement, a fid-type device 100 is positioned in the inlet vapor line 118 so as to provide an annular space between it and the internal wall of the vapor line through which vapor flows in a venturi-like manner. The fid-type device is circular in cross-section having an elongated, cone-shaped downstream portion 102 which comes almost to a point and a short upstream portion 104 (see FIGURE 3). The upstream portion has an annular chamber 106 in it which is connected to an annular feed slot 108. Both the chamber and slot communicate with each other and are positioned about the horizontal axis of the device. A vertically disposed annular groove 110 is positioned in the device communicating with the annular slot 108 so that, when the front and back portions are connected, there is formed an annular orifice 112. The chamber 106 has a conduit 114 connecting it to a material feed line 116 which passes through the wall of the pipe 118 which houses the fid-like device 100.

In the use of the fid-type device, the feed material is pumped through the line 116 into chamber 106 and then through annular slot 108 outwardly through annular orifice 112 where it is radially injected towards the interior wall of the pipe 118 in a manner so that the feed material is distributed in the vapor as it flows through the annular space defined by the interior wall of the pipe and exterior of the fid-type device.

It will be appreciated that the obstruction of this invention, such as the venturi-type and the fid-like devices, can be constructed from metal, glass, fiberglass, Teflon, or other types of structural material that will withstand the pressures, temperatures, and other conditions under which the device must operate and the resistance to the material to be passed through it. It will also be understood that any type of device may be used that will finely disperse particles of material to be stripped in a high velocity vapor flow.

In FIGURE 4 is shown a gas-material admixture being passed through a series of passageways defined by plates 120 shown in an exploded view which, when stacked or packed together, would be separated by gaskets (not shown) to provide relatively narrow, cross-sectional passageways elongated in a direction lateral to the flow of the vapor and material admixture for providing turbulence and surfaces against which the particles in the vapor can impinge to form new and different particles having new and different surfaces. This type of elongated, tortuous path provides an excellent arrangement for the stripping of the volatile substances from the feed mixture dispersed in the continuous vapor phase passing through it.

All of the plates 120 have inlets 122 through which the admixture of material in vapor flows. Upon entering the space between plates, the admixture flows in the narrow, elongated space defined by the plates in packed formation in turbulent flow causing the particles to strike against the plate surface 124 and then exit through outlets 126. In this plate pack arrangement, all of the material enters at the bottom of the space between plates and exits from the top of the plates to the separator 42 as heretofore described.

In FIGURE 5 is shown an alternate plate pack arrangement in which the admixture of vapor and particles of feed material is split into two flows: One flow is passed into bottom inlet 132 of the first space between plates 130 and exits from outlet 134 at the top of that space, then enters the top of third space and exits out of the bottom of it, and so on, until it exits from the plate pack after completing the desired number of passes through passageways. (In this plate pack arrangement, the light stippling designates an alternate space arrangement.) The other flow is passed into the top of the second space (inlet 136) between the plates and exits from outlet 138 at the bottom of the second space from which it enters the bottom of the fourth space and exits from the top of the fourth space into the top of the sixth space, and so on, in the same geometric pattern unit exit from the plate pack is desired. The flows from the passage through the odd-numbered spaces and the even-numbered spaces are then combined and passed into the separator for separating the vapor laden with volatiles from the stripped material residue.

It will be appreciated that many plate pack arrangements can be used as was pointed out, described, and illustrated in my U.S. Patent No. 3,073,380. Also, the plate pack arrangement may vary in accordance with the type of material to be stripped, the amount of volatiles and type of volatiles to be removed, and the physical properties of both the feed material and the stripping vapor.

It also has been found that two or more of the processes illustrated in FIGURE 1 can be combined and operated as multiple-pass arrangements, both in series and/or parallel, with the stripped residue of one pass in the series being the feed material for the processing pass.

FIGURE 6 illustrates a typical series operation where the feed material is passed by pump 20 from feed tank 10 through line 22 into the venturi-type orifice of obstruction 28 and injected in a continuous vapor flow passing in line 30 through the obstruction. The admixture then passes through the plate pack stripping unit 40 to strip the volatiles from the dispersed material, and the admixture exits from the plate pack stripping unit through line 48 into separator 50 where the vapor and the volatiles combined in it are passed to a condenser and the stripped material residue is collected in conical section 52 and passed through pipe 54 by pump 56 which becomes the feed pump for repeating the process to strip further volatiles from the material. Also, the first pass shows an alternative structural unit 40 of the conventional externally heated plate type wherein the plates that define the tortuous path are externally heated such as by steam. The steam for heating the plates defining the tortuous path enters the plate parcel at the front thereof and condensate from the heating steam exits from the end of the plate parcel after giving up its heat.

It will be appreciated that many combinations can be made by the use of multiple-pass arrangements with alteration, if necessary, of the vapor conditions, the tortuous path conditions and the rate of feed or the succeeding passes to produce the desired final stripped material residue.

or impossible to make and assessment is made by organoleptic measurements.

With a styrene-butadiene copolymer latex, however, a quite well-known technique may be used to measure the quantity of residual styrene monomer which remains in the latex after manufacture. The method employed for determination of residual styrene is the wet chemical method ASTM D1417 consisting of:

(1) azeotropic distillation of the residual styrene from the latex with methanol.
(2) reaction of the distilled styrene with bromine from acidified bromine-bromate solution and exchange of excess bromine for iodine with potassium iodide.
(3) titration of the iodine with sodium thiosulfate using starch indicator.

The following Table 1 shows the amount of steam stripping accomplished by the invention. All test data shown represent practical conditions of operation where plates and system were clean after trials which ran continuously for varying but significant periods of time. Each test represents a single passage through the stripper where the actual time for contact was so short as to be unmeasurable.

TABLE 1

| Sample No. | Feed, percent solids | Feed pressure, p.s.i.a. | Feed rate, lb./hr. | Steam rate, lb./hr. | Percent residual styrene [1] In feed | Percent residual styrene [1] In product | Percent residual styrene removed |
|---|---|---|---|---|---|---|---|
| Run No.: | | | | | | | |
| 1 _____ NE 1-669 _____ | 47 | 14.8 | 360 | 176 | 0.457 | 0.112 | 75 |
| 2 _____ NE 1-669-2 ___ | 47 | 14.8 | 360 | 176 | 0.112 | 0.024 | 68 |
| 3 _____ NE 1-663 _____ | 48 | 13.0 | 338 | 139 | 0.188 | 0.064 | 66 |
| 4 _____ NE 1-6617 ____ | 48 | 12.0 | 328 | 160 | 0.60 | 0.083 | 86 |
| 5 _____ NE 1-6617-2 __ | 48 | 12.0 | 328 | 160 | 0.083 | 0.011 | 87 |
| 6 _____ NE 1-6612 ____ | 50 | 13.0 | 312 | 167 | 0.184 | 0.045 | 76 |
| 7 _____ NE 1-6622 ____ | 48 | 12.5 | 600 | 107 | 0.470 | 0.153 | 68 |
| 8 _____ NE 1-6623 ____ | 48 | 14.8 | 500 | 131 | 0.490 | 0.166 | 66 |
| 9 _____ NE 1-6623-3 __ | 48 | 14.8 | 500 | 130 | 0.057 | 0.017 | 70 |

[1] Styrene at 50% total solids.

In operation of the stripping system of this invention, steam, or any vapor or gas having the capacity to remove the volatiles from the feed material to be stripped and having the required temperature and pressure, is passed into a stream inlet line 30 to initiate a continuous phase vapor flow. Material to be stripped is pumped from the supply tank 10 by pump 20 through duplex filters 24 where any undesirable substances or formations in the feed material are removed. From the duplex filters, the feed is passed into the the distributing orifice 32 which effects radial injection of the material into the steam flowing through the venturi-type constriction 28. The steam, moving at a high velocity by passing through the venturi, entrains the material and distributes and disperses it as fine particles admixed in the steam. Thus, the steam being in turbulent flow maintains a homogeneous admixture of feed particles in vapor. The admixture is then passed through the tortuous path 42 of the plate pack stripping unit 40 where the particles are continuously impinged against the wall of the tortuous path forming new and different particles with new surfaces as they pass turbulently through the path, thereby enhancing the degree of volatilization of the volatiles from the feed material. After passage through the tortuous path, the steam laden with the stripped volatiles and the stripped material residue exit into separator 42 where the vapor-containing volatiles are removed and condensed and the material residue is pumped out of the system.

The high efficiency of the stripping by the process and apparatus set forth above is illustrated by the following examples:

Example 1

With many of the fluids being stripped, the material being removed is present in such small quantity that a direct measure of stripping efficiency is frequently difficult The feed material in this case was injected via a feed-type mixer into steam in proportions as shown in the table, i.e., one pound of steam per two pounds of approximately 50% latex to one pound of steam to six pounds of 50% T.S. latex.

This mixture at approximately atmospheric pressure passed through a tortuous path as formed by the space between 30 plates arranged as two 15-pass groups in series and then into a separator vessel held at 28 in Hg vacuum.

The levels of residual styrene in the input feed and in the discharged product is shown, removal of residual styrene being in the range from 66% to 87% in a single pass.

Example 2

A styrene-butadiene copolymer latex of good stability and heat resistance but of extremely high foaming characteristics was injected into the stripping steam using a venturi-type mixer in two series passes. The run was continuous for about an hour for each pass. After the two passes, the equipment was opened and found to be completely clean with no coagulum or fouling evident.

Feed material, first pass ____ 0.52% residual styrene (50% T.S. latex).
Feed rate average _____ 1300 lbs./hr.
Stripping steam _____ 22 p.s.i.g.
Stripping steam rate _____ 200 lbs./hr.
Residual styrene after first pass _____ 0.09% (50% T.S. latex).
Stripping steam rate, second pass _____ 200 lbs./hr.
Residual monomer after second pass _____ 0.024% (50% T.S. latex).

The plate arrangement in this case was five 14-plate sections in series. One pound of steam was used for each 1.5 pounds of dry rubber to reduce styrene from 0.52% (at 50% T.S.) to 0.024% (at 50% T.S.).

Example 3

Continuous runs of three hours were made on a styrene-butadiene latex where the starting material fed to the system was a 27.5% total solids, with residual styrene at 12.5% (on a 50% T.S. basis latex). In three series stripping passes and one concentration stage, the material was reduced to 0.10% residual styrene (on a 50% T.S. basis latex) and concentrated to 72% total solids using a total of 4.5 pounds of steam per one pound of polymer.

Plates were clean at the end of the run and no foaming occurred during the run.

Example 4

This example was run on a polyvinylidene chloride latex which was so heat sensitive and so shear sensitive that existing systems could not be found to strip it of residual monomer. Massive foaming and fouling of all surfaces had been experienced in stripping kettles and towers.

Steam temperature to initiate the vapor continuous phase was set at 160° F. and approximately 500 pounds per hour. Latex with 350 p.p.m. of residual monomer preheated to 160° F. was fed by pressure to a venturi-type mixer at approximately 1200 pounds per hour. Stripped product was dropped into a vacuum tank installed under the separator.

Stripped product after this single pass showed less than 15 p.p.m. of residual monomer.

Example 5

A quaternary ammonium compound in slurry form containing approximately 25% of alcohol and water and odorous volatile components was fed into a tube-type disperser with 40 p.s.i.g. steam and the mixture fed into a plate parcel of three series passes of four plates each. In this case, the alternate plates in the parcel were heated to insure removal of the water. The mixture of vapor and product was discharged into a separator at atmospheric pressure. The product was a dry, free-flowing powder with a marked improvement in odor.

Other materials which have been stripped or from which volatile components have been removed in commercially successful trials by the process and apparatus of this invention are: aroma from coffee, methyl acetate from cellulosic slurry, acetic anhydride from an oily silicone-type material, acrylic acid from a wide range of acrylic latices, odorous components from fatty oils, fatty acid from glyceride, hexane from fatty oils.

In the above examples, widely varying temperatures were employed and a wide range in the proportion of stripping vapor to feed material was used.

It will be appreciated that the stripping process of this invention effectively strips volatiles from materials when these materials are finely divided and dispersed in a continuous vapor phase in a minimum of contact time by continuously reforming particles to present new surfaces of the material and changing by turbulence the vapor atmosphere about the particles so that the maximum degree of vaporization of the volatiles from the particles of material is accomplished.

Although the present invention has been described with particularity with reference to preferred embodiments and various modifications thereof, it will be obvious to those skilled in the art after understanding this invention, that various changes and other modifications may be made therein without departing from the spirit and scope of the invention and the appended claims should therefore be interpreted to cover such changes and modifications.

What is claimed is:

1. A process of removing volatile substances from a flowing feed material comprising initiating a rapidly flowing gaseous stream; injecting a feed liquid containing the volatile substance therein into the gaseous stream to form a turbulent admixture therefrom to expose a large specific surface of the feed material to the gas and conveying it by means of the gas as a continuous phase with dispersed liquid feed therein through a confined tortuous path; controlling temperature of the admixture below a temperature at which the feed material will be damaged; passing the gas and the feed material through the confined tortuous path such that a substantial volatilization of the substance to be removed occurs in said path at the prevailing temperatures and pressures in said path, the said path having a surface configuration that induces high turbulence thereby forming a homogeneous admixture of gas, feed material, and vapor stripped from the feed material, while increasing the velocity of its movement by expansion of the gas; accelerating the removal of the substance being stripped by impinging the particles of the feed material against the confining surface of said tortuous path under time, pressure, and temperature conditions to effect a substantial amount of stripping with substantially all such stripping being done within and throughout the tortuous path from said feed material to said gas; and exiting the homogeneous admixture from the confined tortuous path to a separator and separating the vapor-containing gas from the stripped feed material residue.

2. The process of claim 1 in which a vapor phase having a capacity to absorb volatiles from the feed material is employed in place of the gaseous phase.

3. The process of claim 1 in which the gaseous phase is formed from steam.

4. The process of claim 1 in which the stripping is conducted under vacuum conditions.

5. The process of claim 1 in which the separation of the gas from the stripped feed residue is conducted under atmospheric conditions.

6. The process of claim 1 in which the stripping is carried out under a pressure above atmospheric.

7. The process of claim 1 in which the substance being stripped is a synthetic monomer.

8. The process of claim 1 in which the substance being stripped is a heat-sensitive feed material.

9. The process of claim 1 in which the feed material being stripped is a solution.

10. The process of claim 1 in which the volatiles being removed have a lower boiling temperature than the temperature of the continuous gaseous phase.

11. The process of claim 1 in which the volatiles have a higher boiling temperature than the temperature of the continuous gaseous phase.

12. The process of claim 1 in which an external heat source is applied to maintain as high a temperature in the admixture as is safe for the material being stripped.

13. The process of claim 1 in which more than one processing is conducted in series so that the stripped feed material from one pass through the process is the strippable feed material for the subsequent pass.

14. A process of removing volatile substances from a flowing feed material comprising initiating a gaseous phase and moving it through a confined passageway formed from a plurality of tortuous paths, each path sharing a common path wall with its adjacent path; injecting the feed material into the gaseous phase to form a turbulent admixture therefrom under conditions as to expose a large specific surface of the feed material to the gas; controlling temperature of the admixture below a temperature at which the feed material will be damaged; passing the gas and the feed material through the tortuous paths under conditions as to form a homogeneous admixture of gas, feed material, and vapor stripped from the feed material while increasing the velocity of its movement by expansion of the gas; impinging the particles of the feed material against the walls of the tortuous paths under time, pressure, and temperature conditions to accelerate the removal of the substance being stripped in the form of vapor from said feed material to said gas; and exiting the homogeneous admixture from the confined tortuous passageway and separating the vapor-containing gas from the stripped feed material residue.

15. The process of claim 14 in which the additional heat is added through the wall defining the tortuous path.

References Cited

UNITED STATES PATENTS

| | | | |
|---|---|---|---|
| 2,032,827 | 3/1936 | Andrews | 83—46 |
| 2,177,664 | 10/1939 | Lee | 203—88 |
| 2,524,559 | 10/1950 | Campbell et al. | 230—95 |
| 2,710,057 | 6/1955 | Bassett et al. | 159—2 X |
| 3,050,113 | 8/1962 | Rundquist | 159—13 |
| 3,073,380 | 1/1963 | Palmason | 159—49 |
| 3,123,285 | 3/1964 | Lee | 230—95 X |
| 3,247,890 | 4/1966 | Williams | 159—47 |

NORMAN YUDKOFF, Primary Examiner

J. SOFER, Assistant Examiner

U.S. Cl. X.R.

159—16, 44